Oct. 11, 1960  W. A. BEDFORD, JR  2,955,690
FASTENING DEVICE
Filed Jan. 16, 1958

INVENTOR:
WILLIAM A. BEDFORD JR,
BY Walter P. Jones
ATTORNEY.

United States Patent Office 2,955,690
Patented Oct. 11, 1960

2,955,690

FASTENING DEVICE

William A. Bedford, Jr., North Scituate, Mass., assignor to United-Carr Fastener Corporation, Cambridge, Mass., a corporation of Delaware Filed Jan. 16, 1958, Ser. No. 709,292

3 Claims. (Cl. 189—88)

This invention relates to a molding fastener and more particularly to a device for fastening molding strips or the like to a panel or other supporting body.

In the various manufacturing trades moldings are employed for many purposes. For example, molding strips may be utilized to cover or disguise discontinuities between structural members, such as the joints between abutting panels. They are also placed along and over the extremities of panels or other structural members to eliminate sharp edges which may be undesirable for functional or aesthetic reasons. In the automobile industry moldings, or the so-called "chrome strips," are applied to the surface of sheet metal body members to enhance their appearance and to serve as bumpers or guards.

To attach the molding strips to such panels suitable fasteners must be employed. To eliminate undesirable exposed protrusions of the fastening elements various schemes have been proposed which permit the molding strips to be attached to the panels in such a manner as to hide the fastening elements. The fastener devices proposed heretofore have not been entirely satisfactory, however, primarily because they are rather complex, most of them requiring the assembly of several different parts. In large scale manufacturing operations wherein cost is an important factor, a small difference in the cost of the individual fastener devices can make a substantial difference in the profit margin based on large quantity use or sale of the devices. Accordingly, any device that is simpler in construction and cheaper to manufacture and use will have a ready market. The present invention provides such a device.

It is accordingly a principal object of the invention to provide a unique and improved fastener.

Another object of the invention is to provide an improved molding fastener.

A further object of the invention is to provide a fastener element of unique single piece construction.

An additional object of the invention is to provide an improved screw construction.

Still another object of the invention is to provide a molding fastener which co-acts with the molding in such a way that loosening of the fastener from its supporting panel is prevented.

Yet another object of the invention is to provide a fastener which has a water-tight fit with a supporting panel.

A still further object of the invention is to provide a molding strip fastener device employing at least a pair of unique fastener screws in which engage and hold the molding strip, preventing detachment or turning movement of the strip, the screws themselves being prevented from turning by their engagement with the molding strip.

A more specific object of the invention is to provide a unique fastener device which permits a simple snap-on attachment of the molding strip.

The foregoing and other objects of the invention and the manner in which such objects are accomplished will become more readily apparent upon consideration of the following detailed description of exemplary embodiments of the invention when taken in conjunction with the accompanying drawings which illustrate said embodiments and wherein.

Briefly stated, the invention is based upon a unique screw construction in which the head of the screw is formed to engage and retain a pair of spaced opposed flanges of a molding strip or the like. By employing at least two of the screws of the invention, the strip is prevented from turning, and by virtue of the provision of means whereby the screw heads grip the flanges of the molding strip, turning of the screws is prevented. The construction of the screw heads is such that a water-tight joint with the supporting panel is ensured.

Figure 1:
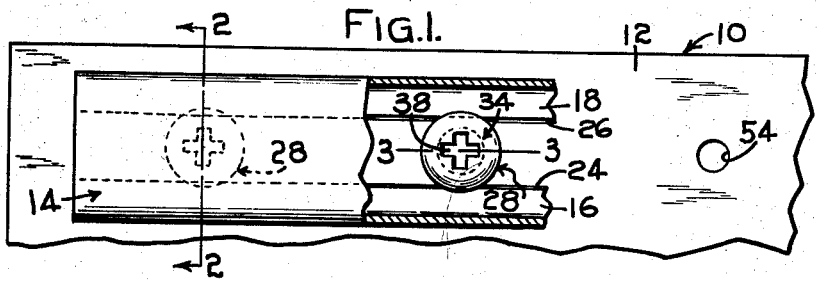
Figure 1 is a plan view illustrating the manner in which the invention permits the attachment of a molding strip to a panel.
Figure 2:
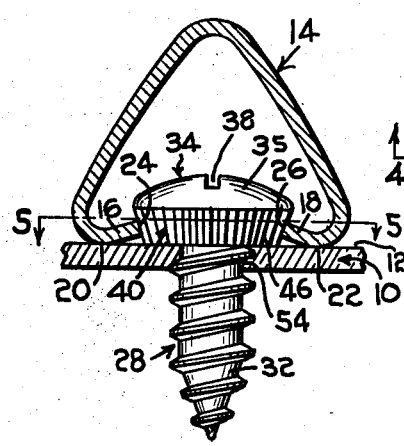
Figure 2 is a sectional view taken along line 2—2 of Figure 1 in the direction of the arrows.
Figure 6:
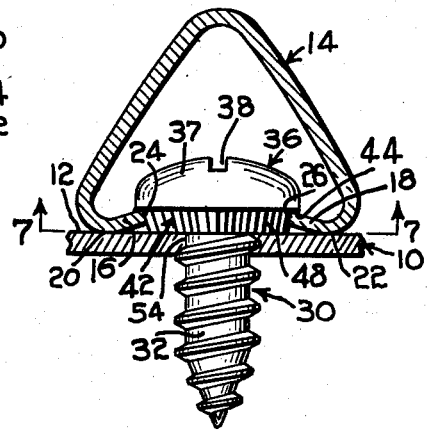
Figure 6 is a sectional view similar to that of Figure 2 and illustrates a modification of the invention.

Referring to the drawings, Figure 1 illustrates a panel 10 or other body member having a surface 12 to which a molding strip 14 is to be attached. In the preferred form of the invention the molding strip is formed of a springy material, such as stainless steel, and has a cross-section configuration, as shown in Figures 2 and 6, that bows away from the surface 12 of the panel. The molding strip has a pair of spaced opposed flanges 16 and 18 which extend generally along the surface 12 but which preferably are angulated slightly away from the surface, as shown in Figures 2 and 6, such that the molding strip engages the surface 12 along regions 20 and 22 which are farther apart than the opposed edges 24 and 26 of the flanges.

Figure 3:
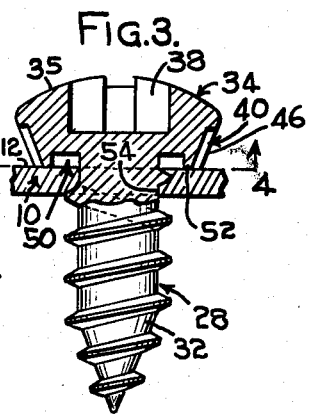
Figure 3 is a sectional view taken along line 3—3 of Figure 1.
Figure 4:
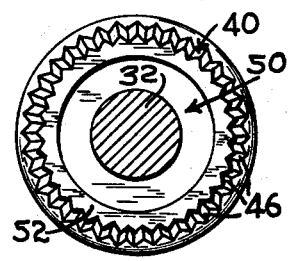
Figure 4 is a sectional view taken along line 4—4 of Figure 3 in the direction of the arrows.
Figure 5:
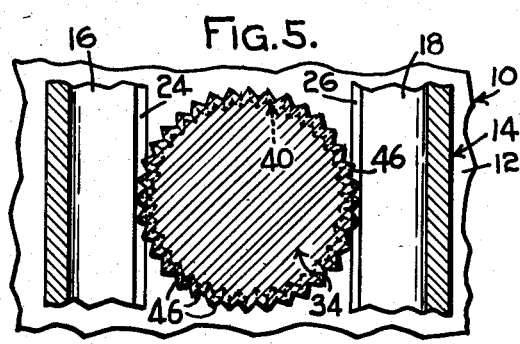
Figure 5 is a sectional view taken along line 5—5 of Figure 2 in the direction of the arrows.

To permit the molding strip 14 to be attached to the panel 10, the present invention employs unique fastener screws, one form of which is generally designated by reference numeral 28 in Figures 1 through 3, and another form of which is generally designated by reference numeral 30 in Figure 6. The screws are preferably formed of a suitable metal, such as steel, and when employed for attaching molding strips to sheet metal panels, the screws are preferably self-tapping and case hardened. In both of the forms illustrated the screw has a pointed threaded shank 32. At the end of the shank opposite the pointed end the screw has a head, designated 34 in Figures 2 and 3 and 36 in Figure 6. The top of the head may be rounded as shown at 35 and 37, respectively, and the head is preferably provided with a suitable means 38 for engaging a screwdriving tool. While in the form shown a Phillips type slot is provided, any other type means, such as a straight slot or a hexagonal slot might be employed.

In both forms of the screw shown the sides of the head are undercut. In the form shown in Figures 2 through 5, the undercutting is accomplished by gradually tapering the sides 40 so that the sides converge toward the pointed end of the screw shank and toward the panel surface 12 when the screw is attached to the panel. In this form of the invention the tapered side walls 40 merge smoothly with the curved upper head portion 35. In the form shown in Figure 6, the sides 42 converge toward the pointed end of the screw shank in a similar manner, but there is a discontinuity between the tapered sides and the curved upper portion 37 of the screw head. In this form the discontinuity is constituted by a lip or step 44 which extends laterally from the sides 42 at the extremity adjacent the curved head portion 37.

Figure 7:
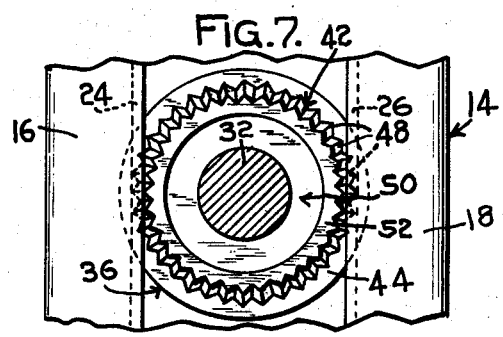
Figure 7 is a sectional view taken along line 7—7 of Figure 6 in the direction of the arrows.

In both illustrative forms of the screw the sides of the head are serrated to provide gripping means. In Figures 2 through 5 the serrations are indicated at 46 and in Figures 6 and 7 at 48. The serrations form spaced ridges which extend in the general direction of the shank 32 and which converge toward the pointed end of the shank as part of the sides of the head. The serrations may be formed by conventional techniques during the manufacture of the screws.

In accordance with another aspect of the invention, the screw heads are preferably provided with a re-entrant bottom generally designated by reference numeral 50 in Figure 3. By this construction the bottom of the screw head is formed with a circumscribing bead 52 which extends toward the pointed end of the shank 32. When the screw is threaded into the sheet metal panel 12 as shown in Figure 3, the bead 52 engages the surface 10 of the panel and forms a water-tight joint between the screw head and the panel. Such a joint prevents the leakage of water around the shank of the screw and eliminates corrosion of the panel 10 which would deface the panel and might tend to loosen the screw. The bead 52 tends to seat the head of the screw flatly against the surface 12 even if the screw is initially threaded in at a slight angle. Moreover, any burrs which exist around the screw hole on the surface 12 are accommodated by the space between the bead 52 and the shank 32 and thus do not interfere with the proper seating of the screw heads.

In using the screws of the invention to attach a molding strip such as 14 to a panel such as 10, holes 54 are drilled or preformed in the panel at spaced locations. The screws of the invention are then threaded into the holes until their heads snugly engage the surface 12 as shown in Figures 2, 3, and 6. Two screws are sufficient to attach a single strip and prevent it from turning relative to the panel 10, but if the strip is lengthy, as is common, a larger number of screws will be employed. The screw holes 54 are formed along the intended path of the molding strip and will define a straight line if the strip is straight or a curved line if the strip is curved.

The molding strip is then simply snapped over the screws by forcing the strip against the surface of the panel, flange side first. In order that the strip will be retained on the screws, the opposed edges 24 and 26 of the flanges are spaced apart less than the maximum diameter of the screw heads so that it is necessary to urge the flanges apart against the inherent resilient bias of the springy strip material to force the strip over the heads of the screws. When the flanges are forced past the maximum diameter portion of the screw heads, they move together under the inherent bias of the springy material and rest against the tapered side walls of the screw heads at diametrically opposed points. The undercutting of the side walls of the screw heads prevents removal of the molding strips once they have been attached to the screws, and in the form shown in Figures 6 and 7, the lip 44 makes the attachment of the strip to the screws even more positive.

When the molding strip has been snapped over a pair of screws, it is obviously impossible to turn the strip with respect to the panel 10, since the strip is fixed at two points. In order that the strip will not become loosened or even detached from the panel after attachment for protracted periods, it is essential that the screws remain tightly affixed to the panel. In accordance with the invention, turning of the screws relative to the panel, which might tend to loosen them, is prevented, once the molding strip has been snapped over the screws, through the gripping of the strip flanges by the serrations of the screw heads. The serrations tend to bite into and grip the edges 24 and 26 of the flanges. By angulating the flanges 20 and 22 with respect to the panel 10 in the manner illustrated in Figures 2 and 6 and described previously, the angles of the edges 24 and 26 may be brought into conformity with the convergence of the side walls of the screw heads so as to increase the surface of engagement with the serrations, thereby increasing the gripping action. Since the molding strip is prevented from turning relative to the panel by the use of a pair of screws, and since the screws are prevented from turning relative to the molding strip by use of the gripping means described, it is readily apparent that neither the screws nor the molding strip can turn relative to the panel, and a firm and snug attachment of the molding strip to the panel is obtained even over long periods of time and under conditions of vibration or shock.

It will be apparent from the foregoing, therefore, that the invention provides a molding fastener which, while simple, is highly effective. While there have been described and shown what are now believed to be preferred embodiments of the invention, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are included therein.

I claim:

1. In combination with a panel and a molding strip of springy material having a pair of spaced opposed flanges, at least two screws threaded into said panel at points longitudinally spaced thereon, said screws having heads contiguous to a surface of said panel, the side walls of said heads being undercut and receiving and engaging said flanges at diametrically opposed points, at least one side wall of at least one of said screws being serrated whereby said screws retain said strip on said panel, and said strip prevents rotation of said screws relative to said panel.

2. The combination of claim 1, said sides converging toward said panel, and said flanges being angulated slightly with respect to said panel so as to extend toward the head end of said screws and having opposed edges angulated to conform to the convergence of said sides.

3. The combination of claim 1, said strip having a cross-section bowed away from said panel, said flanges extending inwardly of said cross-section, and said strip contacting said surface on opposite sides of said screws at points spaced from said screw heads.

References Cited in the file of this patent

UNITED STATES PATENTS

| 1,849,206 | Sater | Mar. 15, 1932 |
| 1,950,041 | Torchia et al. | Mar. 6, 1934 |
| 2,208,541 | Churchill | July 16, 1940 |
| 2,543,705 | Place | Feb. 27, 1951 |
| 2,752,814 | Iaia | July 3, 1956 |

FOREIGN PATENTS

| 325,076 | Italy | Feb. 27, 1935 |